United States Patent [19]

Masanek et al.

[11] Patent Number: 4,563,497
[45] Date of Patent: Jan. 7, 1986

[54] METHOD FOR MAKING WATER SOLUBLE SOLID POLYMERS

[75] Inventors: Juergen Masanek, Pfungstadt; Horst Pennewiss, Darmstadt-Nev-Kranichstein; Hermann Plainer, Reinheim, all of Fed. Rep. of Germany

[73] Assignee: Röhm GmbH, Darmstadt, Fed. Rep. of Germany

[21] Appl. No.: 460,924

[22] Filed: Jan. 25, 1983

Related U.S. Application Data

[63] Continuation-in-part of Ser. No. 213,552, Dec. 5, 1980, abandoned.

[30] Foreign Application Priority Data

Dec. 19, 1979 [DE] Fed. Rep. of Germany ....... 2951087

[51] Int. Cl.$^4$ .......................................... C08F 220/06
[52] U.S. Cl. .................... 524/732; 526/200; 526/240; 526/292.2; 526/307.2; 526/307.6; 526/312
[58] Field of Search ............... 526/307.6, 312, 292.2, 526/240, 307.2, 200; 524/732

[56] References Cited

U.S. PATENT DOCUMENTS

| 1,113,631 | 10/1914 | Hofmann et al. | 526/200 |
|---|---|---|---|
| 2,163,305 | 6/1939 | Dittmar | 526/200 |
| 2,380,476 | 7/1945 | Stewart | 524/732 |
| 3,714,136 | 1/1973 | Gershberg | 260/89.7 S |
| 3,919,140 | 11/1975 | Hirata et al. | 526/200 |
| 4,261,870 | 4/1981 | Gaylord | 526/200 |

FOREIGN PATENT DOCUMENTS

| 918779 | 10/1954 | Fed. Rep. of Germany . |
|---|---|---|
| 2050988 | 5/1971 | Fed. Rep. of Germany . |
| 2248715 | 5/1973 | Fed. Rep. of Germany . |
| 2545290 | 4/1977 | Fed. Rep. of Germany . |

OTHER PUBLICATIONS

Handbook of Chemistry and Physics, 36th Ed., 1957-1958, Chemical Rubber Publishing Co., Cleveland, pp. 280-281.
Polymer Processes, Schildknecht, vol. X ("High Polymers"), 1956, Interscience Publishers, Inc., N.Y., pp. 70, 122-128.
Hoover, J. Macromol. Sci.-Chem. A4(6), 1327-1417 (Oct. 1970).

*Primary Examiner*—Harry Wong, Jr.
*Attorney, Agent, or Firm*—Curtis, Morris & Safford

[57] ABSTRACT

(1) A method for making a water soluble synthetic solid polymer product, which method comprises polymerizing a solution of a water soluble monomer, or of a mixture of monomers which are exclusively or predominantly water soluble monomers, in an aqueous medium in the presence of 0.5 to 50 percent, by weight of said monomer or monomers, of at least one member selected from the group consisting of water soluble solid monosaccharides and oligosaccharides, and (2) the directly millable polymer product having a low degree of crosslinking which is prepared thereby and which is useful as a flocculant, dispersing agent, thickening agent, water treating agent, coating agent or the like.

12 Claims, No Drawings

METHOD FOR MAKING WATER SOLUBLE SOLID POLYMERS

This application is a continuation-in-part of prior application Ser. No. 213,552 filed Dec. 5, 1980, and now abandoned.

The present invention relates to a method for making solid, water soluble, synthetic polymer products and to the polymer products produced thereby.

Water soluble synthetic polymers have acquired a constantly growing significance in technology. The fields in which they are used encompass, among others, use as flocculants, dispersing agents, thickening agents, water treating agents, and coating agents.

From a chemical point of view, a distinction is commonly made between the class of non-ionogenic polymers (e.g. polyacrylamide, polyvinylalcohol, polyethyleneoxide), the class of ionogenic polymers (so called polyelectrolytes), and polyampholytes. In the case of the ionogenic polymers, a further difference can be made between anionic polymers (e.g. polymers containing salts of acrylic, methacrylic, or maleic acid) and cationic polymers [e.g. macromolecules containing quaternary ammonium groups, cf. M. F. Hoover, J. Macrom, Sci. Chem. A 4 (6) 1327–1417 (1970)]. The aforementioned polyampholytes are copolymers containing both anionic and cationic groups. Only a few commercial products are pure homopolymers.

The polyacrylates, which are particularly technically important, are, indeed, mostly copolymers which in addition to salt-forming monomers contain still further electrically neutral monomers polymerized therein, such as acrylamide, acrylonitrile, acrylic esters of lower alcohols, as well as the corresponding methacryl compounds.

The particular interest paid by technology to the development of solid forms of water soluble synthetic polymers is attributable to immediately evident reasons: compared with polymers which are dissolved, shipment of such solids is simpler and cheaper.

The solvent (water) does not tend to be shipped along with the polymer. No attention need be paid to climatic variations. When the materials are used as auxiliaries, unnecessary water need not be added to batches along with the active material. Any desired concentration of the materials in the end product can be attained according to choice by weighing out the necessary amount of the solid, etc.

However, in practice difficulties are encountered even in winning the polymer from its solutions. In the field of flocculants, isolation by precipitation of the polymers with alcohols or acetone in a kneader has been adopted. Further, azeotropic removal of water by means of inert organic solvents, or also direct drying of finely divided solutions on a drying roll, are known.

In the field of polymerization induced by ultraviolet light, the prior art describes a process in which a concentrated aqueous solution of acrylic monomers (e.g. acrylamide, acrylonitrile and/or acrylic acid or its salts and esters) having a pH of at least 8 and which contains a photoinitiator, is poured or sprayed in a relatively thin layer onto a hydrophobic carrier and subsequently irradiated. The high degree of tackiness of the product which is produced is described in later prior art as being an aggravating disadvantage of this method. This later prior art, which recommends the addition of a (thermal) initiator, has as its goal the preparation of polymers with a low molecular weight.

The pressing demand for millable water soluble synthetic polymers remains unchanged. Essentially, the art has still not come any nearer to fulfilling this demand, for example in the case of anionic polyelectrolytes. The problem can be more exactly presented, for example, as being the preparation of solid, directly millable, water soluble polymers in a layer using ultraviolet initiators. In principle, a polymerization with high concentrations of monomer should be strived for. Throughout, the danger is presented of an undesirably high crosslinking. This is true to a particularly high degree when acrylamide is present as a copolymer. In the case of ultraviolet induced copolymerization of acrylic acid with acrylamide, a dry solids content of the polymer of greater than 83 percent is attainable at an elevated temperature and a directly millable polymer is obtained even without the use of a special drying step. However, the polymer is no longer readily water soluble. The cause of the solubility problem may be a molecular weight which is too high, probably brought about by supplementary transfer grafting. In addition, as a rule the residual monomer content in polymerizations proceeding in highly concentrated solutions is very high. In order to avoid the aforementioned disadvantages polymerization must accordingly be carried out at lower monomer concentrations. However, if this is done, the polymerization product obtained is a soft to rubbery-elastic gel.

It has now been found that water soluble synthetic polymer products, solid at room temperature, can be obtained by the polymerization of monomers in an aqueous medium, which polymer products satisfy technological demands very extensively, if from 0.5 to 50 percent by weight (calculated on the amount of monomer added) of a solid, water soluble, mono- and/or oligo-saccharide is added to the polymerization batch and the polymerization is carried out by free radical mechanisms known per se. As a guiding value, sufficient mono- and/or oligo-saccharide is added to the reaction batches according to the present invention such that the solids content of the batches is greater than 80 percent, and is especially greater than 83 percent.

The polymerization methods according to the present invention can, for the remaining part, be carried out in close parallel to the methods representing the state of the art. Thus, the monomers commonly used for the preparation of non-ionogenic polymers, as well as the monomers used for the preparation of anionic or cationic polymers, or for the preparation of polyampholytes, can be polymerized according to the present invention to form water-soluble synthetic solid polymer products in each case relying on known polymerization techniques.

As water soluble non-ionogenic polymers which can be prepared according to the invention, those comprising polyacrylamide, polyvinyl alcohol, or polyethylene oxide should be especially mentioned. Anionic polymers include those comprising acrylic acid, methacrylic acid, and/or maleic acid, particularly in the form of their salts. Cationic polymers are macromolecules containing quaternary ammonium salts. So long as water solubility remains unaffected, other known monomers can be present in copolymers of these materials [cf. Ullmanns Encyclopaedie der Technischen Chemie ("Ullmanns Encyclopedia of Technical Chemistry"), 4th Edition, Volume 11, pages 583–586].

The first-class millability which is generally present in the polymers prepared according to the present invention is particularly outstanding. It should be stressed that the polymers produced according to the invention meet the first requirement of flocculants, namely perfect water solubility, a property which would be impaired by cross linking.

It is advantageous for achieving the desired results if, at the moment of polymerization, a homogeneous solution of all the components is present. The homogeneous polymer layer which is prepared in the course of the method according to the present invention is transparent and thus also permits a polymerization with ultraviolet light.

The mono- and/or oligo-saccharide which is added apparently performs several functions in the polymerization batch. It is to be assumed that it not only acts as an inert filler which imparts desired hardness to the product, but that it also assumes the function of a (weak) chain transfer agent which inhibits the tendency to crosslinking, particularly in the terminal stages of polymerization. Thus, relatively low molecular weights are attained using a large addition of carbohydrate. However, if a high molecular weight is sought for—as in the normal case—then the carbohydrate content should not exceed 20 percent of the total batch.

As a rule, 1 percent solutions, in distilled water, of the products prepared according to the invention exhibit viscosities about 2000 mPa.s at 20° Centigrade. In the normal case, it can be presumed that the molecular weight of the polymers prepared according to the invention reaches or exceeds a value of $10^6$.

By proceeding according to the method of the present invention, it is possible to impart to the polymerization products two properties which have heretofore been difficult or impossible to combine, namely freedom from crosslinking and millability. As an example, particular reference is made to the copolymerization of acrylamide with other monomers, particularly with acrylic acid.

As a rule, the water solubility of the monomers results from the presence of amide, carboxyl, sulfonate, nitrile, hydroxy, amino, or ammonium functions in the molecule together with the group which facilitates polymerization, or from the presence of a heterocycle, above all of a heterocycle containing nitrogen or nitrogen and oxygen.

The method according to the invention can be used keeping in mind the polymerization of non-ionogenic monomers, for example the ultraviolet-induced polymerization of concentrated acrylamide solutions, as described in prior art such as German Offenlegungsschrift 25 45 290.

The anionic polymers are, primarily, derived from free radically polymerizable carboxylic acids, anhydrides, or other acid precursors. Thus, monomers of alpha, beta-unsaturated carboxylic acids are of interest. For example, maleic acid, fumaric acid, itaconic acid, crotonic acid, and, preferably, acrylic acid and methacrylic acid, are to be mentioned. The compounds can be used per se or in the form of their salts. As salts, for example, the alkali metal salts or ammonium salts are to be considered. Further, copolymerization with other anionic monomers such as vinyl sulfonic acid and its salts, styrene sulfonates, and the like, is possible. At the same time, non-ionized, neutral, water soluble monomers such as acrylamide or methacrylamide, acrylonitrile, and vinyl compounds of heterocyclic polymerizable monomers such as vinyl pyridine, vinyl pyrrolidine, vinyl pyrrolidone, and vinyl imidazole, inter alia, can be added as further comonomers. Also, less hydrophilic monomers such as esters of acrylic or methacrylic acid can be copolymerized to such a degree that water solubility is not negatively influenced. Further, the hydroxyalkyl esters and the aminoalkyl esters of acrylic acid and methacrylic acid can be mentioned as monomers, as well as the aminoalkyl amides of these acids. These can be derivatives of primary, secondary, tertiary, or quaternary amines. Exemplary of monomers of the aforementioned kind are 2-hydroxyethyl acrylate or 2-hydroxyethyl methacrylate, 2-hydroxypropyl acrylate or -methacrylate, 4-hydroxybutyl-acrylate or -methacrylate, dimethylaminoethyl-acrylate or -methacrylate, as well as piperidinoalkyl-, morpholinoalkyl- or piperazinoalkyl-acrylates- or -methacrylates. The aminoalkyl-acrylates or -methacrylates in the form of their salts are to be considered as cationic monomers. Further representatives of the cationic monomers are, for example, monomers having quaternary ammonium groups, particularly the quaternization products of dialkylaminoalkyl esters of acrylic acid or of methacrylic acid. N,N-dimethylamino-ethyl-acrylate or -methacrylate, N,N-diethylaminoethyl-acrylate or -methacrylate, inter alia, and the quaternization products thereof, are mentioned. In addition, as already described above, monomers which are not substantially water soluble can be copolymerized with water soluble monomers to an extent such that they do not detract from the water solubility of the polymeric product.

The amount of the water insoluble monomers for this reason is as a rule less than 10 percent by weight of the total monomers used. In carrying out the method using anionic monomers the polymerization is advantageously performed at pH values from 5 to 14, preferably from 6 to 11. The particularly preferred region is made practically accessible for the first time by the use of mono- or oligo-saccharides and/or derivatives thereof according to the present invention. When using the method with cationic monomers, the polymerization can advantageously be carried out at a pH value below 8, preferably at a pH from 3 to 6. The preparation of polyampholytes, which contain anionic as well as cationic monomers, also falls within the scope of the present invention. In adjusting the pH value in this case, suitable care should be taken that the polymerization is carried out at a pH value sufficiently far removed from the isoelectric point of the electrolytes present.

Among the mono- and/or oligo-saccharides to be used according to the present invention, sugar units such as glucose, fructose, sorbose, galactose, mannose, xylose, etc. are to be understood, preferably those having 6 carbon atoms—in agreement with the conventional nomenclature—as well as saccharides having from 2 to at most 20 monosaccharide units bonded by glycoside bonding, particularly the di- to tetra-saccharides. The same or different sugar units may be present in the molecule. As di-saccharides, the following materials can be mentioned as exemplary: saccharose (sucrose), lactose, maltose, cellobiose, and melibiose. As tri-saccharides raffinose, melecitose, gentianose, and others can be mentioned. Stachyose is a suitable tetra-saccharide. Further, the decomposition products of polymeric carbohydrates which have been treated with acids or enzymes are to be considered as encompassed by the invention to the extent that they fall within the foregoing definitions of mono-saccharides or oligo-saccharides. For example, the oligoglucosides obtained from starch under the influence of amylase can be mentioned, as well as decomposition products of cellulose, xylan, and the like, again to the extent that these meet the aforementioned definitions. In addition, however, also water soluble sugar derivatives in which functional groups of the sugar units have been transformed into other functional groups are to be understood to be encompassed by the invention. For example, the original functional groups can be converted to acid or alcohol groups by oxidation or reduction, or can be esterified or etherified. Thus, sugar alcohols such as sorbitol, or monoethyl ethers such as glycosemonomethyl ether, can be used within the scope of the present invention.

The ability of saccharides which have priorly been irradiated with ultraviolet light to initiate the homopolymerization of acrylamide in an aqueous medium is described in the prior art. However, it was also found that priorly irradiated sucrose was nearly inactive with reference to the polymerization of acrylic acid, of N-vinyl-2-pyrrolidone, of acrylonitrile, and of methyl methacrylate.

The polymerization can be carried out in a manner known per se, for example in foil bags as described in Belgian Pat. No. 695,342, in open pans as described in German Pat. No. 1,770,588, or on an endless belt as described in German Offenlegungsschrift 25 45 290. The (free radical) polymerization can be initiated and guided using conventional accelerators such as peroxides or azo-compounds, or also by radiation (ultraviolet or gamma radiation) [cf. H. Rauch-Puntigam and T. Voelker, "Acryl- und Methacrylverbindungen", ("Acrylic and Methacrylic Compounds"), Springer-Verlag, 1967]. Conventional auxiliary agents, for example chain transfer agents such as sulfur chain transfer agents, can be used if they serve a purpose. In overcoming technical problems which arise, such as the removal of heat and the like, the solutions to these problems which represent the state of the art can usefully be employed. It is not necessary in all cases immediately to prepare a directly millable product. The addition of mono- and/or oligo-saccharides according to the present invention in every case makes possible an increase in the dry solids content so that only a short period of post-drying is necessary in order to reach the region of millability (greater than 83 percent solids content).

It has further been found that, surprisingly, transfer grafting onto polymers which may be present, as is normally otherwise observable, does not take place or only takes place to a minor degree in the presence of mono- and/or oligo-saccharides or their derivatives according to the present invention. Thus, for example, it is possible to carry out the reaction in the presence of 0.1 to 10 percent, by weight of the monomers present, of soluble starch (a polymer known to be particularly graft-active) in addition to low molecular weight starch decomposition products when following the characteristic features of the present invention.

A further advantage in this connection is that, in the presence of the mono- and/or oligo-saccharides which are to be added according to the present invention, no decrease in the quality of the product on drying, for example by subsequent crosslinking, is observed—as is otherwise possible.

In addition, the rate of solution of a saccharide-containing polymer in water is significantly increased.

A better understanding of the present invention and of its many advantages will be had by referring to the following specific Examples, given by way of illustration. Viscosities are measured at 20° Centigrade.

EXAMPLE 1

Polymerization of non-ionic monomers using mono- or oligo-saccharides

At 50° C., a homogeneous solution (pH=10.5) is prepared from
70.0 g of acrylamide
19.5 g of acrylic acid
15.0 g of saccharose
5.0 g of water
30.6 g of 50% KOH
0.2 g of pentaerythritol tetrathioglycolate
0.1 g of benzoin ethyl ether and
0.1 g of "Titriplex" (tradename for a chelate-former for complexometry).

This solution was irradiated, in the form of a 1 cm thick layer in an aluminum foil pan, at a distance of 18.5 cm with ultraviolet light (20-watt lamp; type: Philips PL 20 W/05) and polymerized isothermally at 60° C. (The lamp is turned off if a temperature sensor shows that a temperature of 60° C. is exceeded). The product so obtained is hard and brittle, and thus is directly millable (dry solids content=85.2 percent, active ingredient=74.1 percent). A one percent solution of the product has a viscosity of 5,000 mPa.s. It is homogeneous and, thus, adapts itself very well for use as a flocculating agent for kaolin.

Cellobiose, methyl-alpha-D-glucopyranoside, or starch decomposition products with dextrose equivalent values from 5 to 50 percent [cf. Schormueller, "Handbuch der Lebensmittel-Chemie" ("Handbook of Foodstuff Chemistry"), Volume 5, part 1, Springer-Verlag, 1967, page 660] can be used as the carbohydrate additive with equally good results.

EXAMPLE 2

Polymerization of non-ionic monomers without the use of mono- and/or oligo-saccharides At 50° C., a homogeneous solution (pH-10.3) is prepared from
70.0 g of acrylamide
19.5 g of acrylic acid
5.0 g of water
30.6 g of 50% KOH
0.2 g of pentaerythritol tetrathioglycolate
0.01 g of benzoin ethyl ether and
0.1 g of "Titriplex"
and polymerized as in Example 1. On conclusion of the polymerization a rubbery-elastic gel is obtained (dry solids content and content of active material=79.8 percent) which cannot be directly milled. A one percent solution is crosslinked (i.e. no homogeneous solution will be formed with water) and has a viscosity of 6400 mPa.s. The product cannot be used as a flocculating agent since it does not meet the foremost criterion of a flocculating agent, i.e. perfect water solubility.

EXAMPLE 3

Polymerization to produce a weakly cationic product using saccharide derivatives A homogeneous solution is prepared at 50° C. (pH=3-5) from the following ingredients:
74.8 g of acrylamide 13.2 g of 2-trimethylammoniumethyl methacrylate-chloride
12.6 g of water
5.5 g of D-mannitol
5.5 g of adipic acid
0.09 g of "Titriplex"
0.0132 g of anthraquinone-2-sulfonic acid, sodium salt (1%), and
0.0031 g of benzoin (1%).

The mixture is polymerized according to Example 1 (bath temperature=40° C., lamp distance=48 cm). After completion of the polymerization, a brittle product (active material=80%) is obtained which can be ground and a one percent solution of which is homogeneous and has a viscosity of 2600 mPa.s.

EXAMPLE 4

Polymerization to produce a cationic product using an oligosaccharide in the presence of soluble starch A homogeneous solution is prepared at 50° C. (pH=3-5) from:
62.7 g of acrylamide
26.9 g of 2-trimethylammoniumethyl methacrylate-chloride
12.6 g of water
4.5 g of adipic acid
2.5 g of saccharose
2.5 g of soluble starch ("Amisol VA 62N")
0.09 g of "Titriplex"
0.0134 g of anthraquinone-2-sulfonic acid, sodium salt, and
0.0031 g of benzoin The mixture is polymerized as in Examples 1-3. A brittle millable product (active material=81%) is obtained, a one percent solution of which is homogeneous and has a viscosity of 6800 mPa.s.

EXAMPLE 5

Polymerization to produce an anionic product using saccharose

Polymerization is carried out in a trough made of V2A-steel, lined and eventually covered with a polyester foil, and equipped with a temperature sensor for temperature regulation, a plotter, and a thermoregulated oil bath. Polymerization is initiated by irradiating with an ultraviolet lamp (20 watt). The following ingredients are used:
44.86 g of acrylic acid
39.59 g of powdered potassium hydroxide (88 percent by weight)
1.4 g of 2-hydroxyethyl methacrylate
14.0 g of saccharose (20% based on monomers)
30.8 g of water
0.006 g of 2-ethoxy-2-phenyl acetophenone (0.0086% based on monomers).

The powdered KOH is added slowly to the acrylic acid and the saccharose and water in a reaction flask kept in an ice-water bath. The temperature is kept between 40° and 50° C. After neutralization, the pH-value of the resulting solution is adjusted to 7.8. Then 2-hydroxyethyl methacrylate and the acetophenone are added. The mixture is then poured into the polymerization trough and polymerization is effected by UV-radiation at a bath temperature of 50° C. and a reaction temperature of 60° C. The product is readily millable.

With 1% by weight of polymer in water, perfect solubility is observed. The viscosity is 12000 mPa.s.

EXAMPLE 6

Polymerization to produce an anionic product in the absence of a saccharide

Example 5 is repeated except that saccharose is omitted. Without saccharose present, a crosslinked, essentially water insoluble product is obtained. Individual particles of the polymer show a high degree of swelling in water.

EXAMPLE 7

Polymerization to produce a cationic product without the use of a mono- or oligosaccharide A homogeneous solution is prepared at 40° C. from the following ingredients
100 g of 2-trimethylammoniumethyl methacrylate chloride,
25 g of distilled water,
0.015 g of anthraquinone-2-sulfonic acid, sodium salt,
0.0035 g of benzoin, and
0.1 g of "Titriplex".

The solution was irradiated in the form of a 1 cm thick layer in an aluminum foil pan with an ultraviolet light source (20 watt lamp) at a distance of 48.5 cm and was polymerized isothermally at 60° C. (bath temperature 70° C.). The foil pan was covered with a plastic foil. The product so obtained contains 80% by weight of polymer. It is not millable.

A one percent solution of the product in distilled water has a viscosity of 5800 mPa.s. The solution is homogeneous at a pH of 3.7.

EXAMPLE 8

Polymerization to produce a cationic product using a saccharide

A homogeneous solution is prepared at 50° C. from the following ingredients:
104 g of 2-trimethylammoniumethyl methacrylate chloride,
16 g of distilled water,
10.4 g of saccharose,
0.015 g of anthraquinone-2-sulfonic acid, sodium salt,
0.0035 g of benzoin, and
0.1 g of "Titriplex".

Polymerization is carried out (at 60° C.) as described in Example 7 except that the bath was kept at 50° C. The product so obtained contains 80% by weight of polymer. It is readily millable.

A one percent solution of the product in distilled water has a viscosity of 5700 mPa.s. The solution is homogeneous at a pH of 3.6.

EXAMPLE 9

Polymerization of a cationic monomer with a non-ionic monomer using saccharide

The following mixture was used for polymerization:
98.8 g of 2-trimethylammoniumethyl methacrylate chloride,
5.2 g of methyl methacrylate,
10.0 g of distilled water,
10.4 g of saccharose,
0.015 g of anthraquinone-2-sulfonic acid, sodium salt,
0.0035 g of benzoin, and
0.1 g of "Titriplex".

Polymerization was carried out as described in Example 7. The product so obtained had a polymer content of 80% by weight and is readily millable.

A one percent solution of the product in distilled water has a viscosity of 1175 mPa.s. The solution is homogeneous at a pH of 3.6.

EXAMPLE 10

Copolymerization of a cationic monomer with a non-ionic monomer without the use of saccharide The following mixture was used for polymerization:
95 g of 2-trimethylammoniumethyl methacrylate chloride,
5 g of methyl methacrylate,
25 g of distilled water,
0.015 g of anthraquinone-2-sulfonic acid, sodium salt,
0.0035 g of benzoin, and
0.1 g of "Titriplex".

Polymerization was carried out as described in Example 7. The product so obtained contained 80% by weight of polymer. It is not millable.

A one percent solution of the product in distilled water has a viscosity of 1350 mPa.s. The solution is not fully homogeneous at a pH of 3.5.

EXAMPLE 11

Polymerization to produce an ampholytic polymer without the use of a saccharide

A homogeneous solution was prepared at 50° C. from the following ingredients:
40 g of 2-trimethylammoniumethyl methacrylate chloride,
32 g of acrylamide,
8 g of acrylic acid,
10 g of distilled water,
0.012 g of 2-ethoxy-2-phenylacetophenone, and
0.08 g of "Titriplex".

Polymerization is carried out as described in Example 7. The product so obtained contained 88% by weight of polymer and is crosslinked to a high degree. It is, however, millable.

EXAMPLE 12

Polymerization to produce an ampholytic polymer using a saccharide

A homogeneous solution is prepared at 50° C. from the following ingredients:
40 g of 2-trimethylammoniumethyl methacrylate chloride,
32 g of acrylamide,
8 g of acrylic acid,
8 g of saccharose,
10 g of distilled water,
0.012 g of 2-ethoxy-2-phenylacetophenone, and
0.08 g of "Titriplex".

Polymerization is carried out as described in Example 7. The product so obtained contained 81.6% by weight of polymer and is readily millable.

A one percent solution of the product in distilled water has a viscosity of 5800 mPa.s. The solution is homogeneous at a pH of 2.7.

EXAMPLE 13

Polymerization of non-ionic monomers using a saccharide

A homogeneous solution is prepared at 65°–70° C. using the following ingredients:
40 g of acrylamide,
40 g of methacrylamide,
20 g of distilled water,
16 g of saccharose,
0.008 g of 2-ethoxy-2-phenylacetophenone, and
0.08 g of "Titriplex".

The solution was irradiated in the form of a 1 cm thick layer in an aluminum foil pan at a distance of 18.5 cm with an ultraviolet light source (20 watt lamp) and was polymerized isothermally at 70° C. (bath temperature 55° C.). The foil pan was covered with a plastic foil. The product so obtained contained 69% by weight of polymer and was readily millable.

A one percent solution of the product in distilled water had a viscosity of 50 mPa.s.

EXAMPLE 14

Polymerization of non-ionic monomers without the use of a saccharide

A homogeneous solution was prepared at 60° C. using the following ingredients:
40 g of acrylamide,
40 g of methyacrylamide,
35.96 g of distilled water,
0.008 g of 2-ethoxy-2-phenylacetophenone, and
0.08 g of "Titriplex".

The reaction was carried out as described in Example 13 except that isothermal polymerization was at 60° C. (bath temperature 50° C.). The product so obtained contains 69% by weight of polymer and is not millable. It is crosslinked to a high degree.

What is claimed is:

1. A method for making a hard, brittle composition which can be ground without prior removal of water therefrom, said composition comprising a water soluble synthetic polymer and having a solids content greater than 83 percent, which method comprises free-radically polymerizing a polymerization batch consisting essentially of an aqueous solution of a free-radically polymerizable water soluble monomer selected from the group consisting of non-ionic, anionic, cationic, and ampholytic acrylic and methacrylic monomers which are exclusively or predominantly water soluble, or of a mixture of such monomers, said polymerization proceeding in the presence of 0.5 to 50 percent, by weight of said monomer or monomers, of at least one member selected from the group consisting of water soluble solid monosaccharides and oligosaccharides, the solids content of said aqueous solution being greater than 83 percent.

2. A method as in claim 1 wherein said water soluble monomer is, or said mixture of monomers comprises, an anionic monomer.

3. A method as in claim 2 wherein said mixture of monomers comprises a first member selected from the group consisting of acrylamide and methacrylamide and a second member selected from the group consisting of acrylic acid and methacrylic acid.

4. A method as in claim 2 wherein the polymerization is carried out at a pH between 5 and 14.

5. A method as in claim 2 wherein the polymerization is carried out at a pH between 6 and 11.

6. A method as in claim 1 wherein said water soluble monomer is, or said mixture of monomers comprises, a cationic monomer.

7. A method as in claim 6 wherein said cationic monomer is, or said mixture of monomers comprises, a salt of a tertiaryamino ester or tertiaryamino amide of acrylic acid or of methacrylic acid, or a salt of a quaternaryamino ester or quaternaryamino amide of acrylic acid or of methacrylic acid.

8. A method as in claim 7 wherein said cationic monomer is selected from the group consisting of salts of dialkylaminoalkyl acrylates and methacrylates, salts of dialkylaminoalkyl acrylamides and methacrylamides, and quaternary ammonium salts of such acrylates, methacrylates, acrylamides, and methacrylamides.

9. A method as in claim 6 wherein the polymerization is carried out at a pH below 8.

10. A method as in claim 6 wherein the polymerization is carried out at a pH from 3 to 6.

11. A method as in claim 1 wherein said monosaccharide or oligosaccharide is present in an amount from 1 to 20 percent, by weight of the monomer or monomers.

12. A method as in claim 1 wherein said water soluble monomer is, or said mixture of water soluble monomers comprises, acrylamide.

* * * * *